US009942908B2

United States Patent
Agrawal et al.

(10) Patent No.: US 9,942,908 B2
(45) Date of Patent: *Apr. 10, 2018

(54) RESOURCE SHARING AMONG MULTIPLE SERVICE PROVIDERS IN A WIRELESS NETWORK CLOUD

(71) Applicant: International Business Machines Corporation, Armonk, NY (US)

(72) Inventors: Dakshi Agrawal, Monsey, NY (US); Dinesh C. Verma, New Castle, NY (US); Murtaza Zafer, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/959,844

(22) Filed: Aug. 6, 2013

(65) Prior Publication Data
US 2014/0307640 A1    Oct. 16, 2014

Related U.S. Application Data

(63) Continuation of application No. 13/860,149, filed on Apr. 10, 2013.

(51) Int. Cl.
*H04W 72/04* (2009.01)
*H04W 28/16* (2009.01)

(52) U.S. Cl.
CPC ....... *H04W 72/0493* (2013.01); *H04W 28/16* (2013.01)

(58) Field of Classification Search
CPC ...... H04W 72/04; H04W 88/08; H04W 76/00
See application file for complete search history.

(56) References Cited

U.S. PATENT DOCUMENTS 6,990,087 B2    1/2006    Rao et al.
7,561,879 B2    7/2009    Kuchibhotla et al.
(Continued)

FOREIGN PATENT DOCUMENTS

CN           101083825 A        12/2007
WO      WO2010065506 A1         6/2010

OTHER PUBLICATIONS

Alptekin et al., "An efficient spectrum management mechanism for cognitive radio networks," 2009 IFIP/IEEE International Symposium on Integrated Network Management (IM) (Jun. 2009).
Y. Lin et al., "Wireless network cloud: Architecture and system requirements," IBM Journal of Research and Development, Jan.-Feb. 2010, vol. 54, issue 1.
K. Pederson, F. Frederiksen, C. Rosa, H. Nguyen, L. Garcia and Y. Wang, "Carrier aggregation for LTE-advanced: functionality and performance aspects," IEEE Communications Magazine, Jun. 2011.
(Continued)

*Primary Examiner* — Zhiren Qin
(74) *Attorney, Agent, or Firm* — Rabin Bhattacharya; Michael J. Chang, LLC

(57) ABSTRACT

Techniques for resource sharing among wireless service providers in a wireless network cloud (WNC) are provided. In one aspect, a method for spectrum sharing in a WNC that hosts multiple wireless service providers is provided. The method includes the following steps. A spectrum usage is predicted for each of the wireless service providers during a given future time-window. An excess amount of spectrum, if any, each of the wireless service providers will have during the given time-window is determined. The excess amount of spectrum is allocated from the wireless service providers having the excess amount of spectrum to those of the wireless service providers having a spectrum usage that will exceed an allocated spectrum capacity during the given time-window.

15 Claims, 3 Drawing Sheets

(56) References Cited

U.S. PATENT DOCUMENTS

| | | |
|---|---|---|
| 7,751,326 B2 | 7/2010 | Dunlop et al. |
| 7,894,821 B2 | 2/2011 | Bai et al. |
| 2007/0149187 A1 | 6/2007 | Levy |
| 2007/0281710 A1 | 12/2007 | Bai et al. |
| 2008/0108365 A1* | 5/2008 | Buddhikot ............ H04W 16/10 455/452.1 |
| 2009/0323640 A1 | 12/2009 | Chakrabarti et al. |
| 2011/0125905 A1 | 5/2011 | Baucke et al. |
| 2012/0014332 A1 | 1/2012 | Smith et al. |
| 2012/0044876 A1 | 2/2012 | Taaghol |
| 2012/0142382 A1 | 6/2012 | Stanforth et al. |
| 2012/0307765 A1 | 12/2012 | Chakrabarti et al. |
| 2013/0196677 A1* | 8/2013 | Smith ................... H04W 72/10 455/452.1 |
| 2014/0220993 A1* | 8/2014 | Cordeiro ............... H04W 16/14 455/452.1 |

OTHER PUBLICATIONS

O. Simeone et al., "Spectrum Leasing to Cooperating Secondary Ad Hoc Networks," IEEE Journal on Selected Areas in Communications, vol. 26, No. 1, Jan. 2008.

J.M. Peha, "Approaches to Spectrum Sharing," IEEE Communications Magazine, Feb. 2005.

S.K. Jayaweera et al., "Learning to Thrive in a Leasing Market: An Auctioning Framework for Distributed Dynamic Spectrum Leasing (D-DSL)," IEEE Wireless Communications & Networking Conference (WCNC 2011), Cancun, Mexico, Mar. 2011.

Yonis et al., "Effective Carrier Aggregation on the LTE-Advanced Systems," International Journal of Advanced Science and Technology, vol. 41, Apr. 2012.

P. Brockwell, R. Davis, "Introduction to time series and forecasting, Nonstationary and Seasonal Time Series Models" Springer, 2nd edition, 2002.

* cited by examiner

RESOURCE SHARING AMONG MULTIPLE SERVICE PROVIDERS IN A WIRELESS NETWORK CLOUD

CROSS-REFERENCE TO RELATED APPLICATION(S)

This application is a continuation of U.S. application Ser. No. 13/860,149 filed on Apr. 10, 2013, the disclosure of which is incorporated by reference herein.

FIELD OF THE INVENTION

The present invention relates to wireless network clouds (WNCs) and more particularly, to techniques for resource (e.g., spectrum) sharing among wireless service providers in a WNC.

BACKGROUND OF THE INVENTION

Wireless network cloud (WNC) is a new architecture for building the next generation of mobile and cellular networks by utilizing software-defined-radios and cost-efficient signal processing in a cloud. See, for example, Y. Lin et al., "Wireless network cloud: Architecture and system requirements," IBM Journal of Research and Development, January-February 2010, vol., 54, issue 1. Traditional cellular networks consist of fixed base-stations that employ custom-built hardware and software to process wireless signals, which then connect back to the Internet/PSTN network. With the exponential growth in volume of wireless data, the main drawback with traditional designs is the huge capital investment required in scaling the network, in installing/maintaining/upgrading base-stations and other custom-built wireless equipment as the wireless standards evolve over time. Alternatively, in a wireless network cloud architecture, the base-stations are replaced with much cheaper Remote Radio Heads (RRH) which simply convert wireless waveforms into digital signals, which are then processed in a back-end cloud infrastructure. By exploiting the highly cost efficient processing in a cloud, commodity-hardware and collaborative signal processing, a wireless network cloud architecture provides a cost effective way to build scalable next-generation cellular networks.

Wireless resources such as spectrum are valuable resources (for increasing capacity and data rates), but are limited due to the limited frequency bands allotted by the FCC for commercial use. In current networks, spectrum is bought by service providers with long-term contracts and there is no mechanism to share spectrum dynamically, due to a prohibitive overhead in reconfiguring thousands of base-stations (which individually process the wireless signals).

Thus, techniques for dynamically sharing wireless resources such as spectrum in a WNC would be desirable.

SUMMARY OF THE INVENTION

The present invention provides techniques for resource sharing among wireless service providers in a wireless network cloud (WNC). In one aspect of the invention, a method for spectrum sharing in a WNC that hosts multiple wireless service providers is provided. The method includes the following steps. A spectrum usage is predicted for each of the wireless service providers during a given future time-window. An excess amount of spectrum, if any, each of the wireless service providers will have during the given time-window is determined. The excess amount of spectrum is allocated from the wireless service providers having the excess amount of spectrum to those of the wireless service providers having a spectrum usage that will exceed an allocated spectrum capacity during the given time-window.

In another aspect of the invention, a system for spectrum sharing in a wireless network cloud that hosts multiple wireless service providers is provided. The system includes resource management modules associated with each of the wireless service providers configured to (a) predict a spectrum usage for each of the wireless service providers during a given future time-window, and (b) determine an excess amount of spectrum, if any, each of the wireless service providers will have during the given time-window; and a resource-broker module that interfaces with the resource management modules configured to allocate the excess amount of spectrum from the wireless service providers having the excess amount of spectrum to those of the wireless service providers having a spectrum usage that will exceed an allocated spectrum capacity during the given time-window.

A more complete understanding of the present invention, as well as further features and advantages of the present invention, will be obtained by reference to the following detailed description and drawings.

DETAILED DESCRIPTION OF PREFERRED EMBODIMENTS

Figure 1:
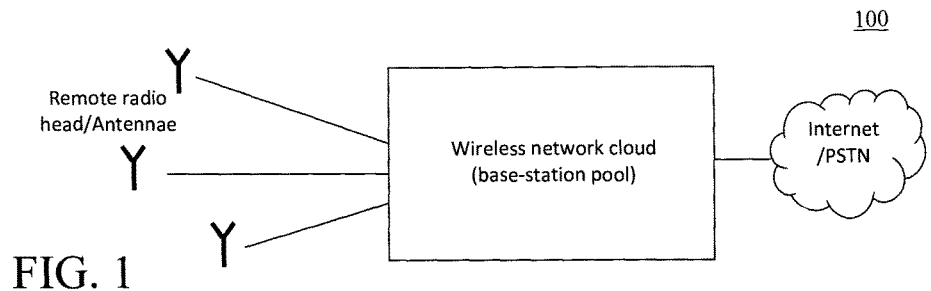
FIG. 1 is a diagram illustrating a wireless network cloud (WNC) architecture in which the present resource sharing system is implemented according to an embodiment of the present invention.

Provided herein are techniques for dynamic sharing of network resources, e.g., spectrum, at fast time-scales in a wireless network cloud (WNC). The term "fast time-scales" as used herein means that the process of spectrum sharing can operate at the same granularity of time-scale at which user-device calls are being handled, as opposed to pre-set spectrum allocation contracts which are negotiated over a much longer time-scale. The term "dynamic sharing" as used herein means that the process of spectrum sharing is a repeated process that executes repeatedly over time in response to events on current spectrum utilization by the users. All signal-processing is done in the back-end in a WNC, and thus dynamic sharing of spectrum at fast time-scales as proposed herein is feasible.

Specifically, provided herein is a system and method for the dynamic sharing of wireless spectrum among multiple service providers in a WNC-based environment which is based on dynamic fluctuations in the user-demands in each service-provider network. The term "spectrum" as used herein refers to a combination of a particular radio frequency band and a communication time-slot. For example, a frequency band of 900-900.1 MHz over a specified 1 millisecond communication time-slot. The multiple service-providers could be either hosted on the same WNC infrastructure (i.e., common radio-heads and cloud computing resources) or they could have their own WNC infrastructure, or a combination of both. A service-provider which is currently experiencing high utilization of its spectrum can request additional spectrum for a short-period of time from other service providers in a WNC enabled cellular network. In this manner, service providers with momentarily high spectrum utilization can alleviate capacity problems, while another service provider with a low utilization can gain additional revenue by leasing its unused spectrum. The present techniques enable this dynamic sharing at fast time-scales in a WNC based system architecture. The mobile devices would adapt to the spectrum sharing by utilizing carrier aggregation techniques for spectrum aggregation. See, for example, K. Pederson, F. Frederiksen, C. Rosa, H. Nguyen, L. Garcia and Y. Wang, "Carrier aggregation for LTE-advanced: functionality and performance aspects," IEEE Communications Magazine, June 2011, the contents of which are incorporated by reference herein.

As will be described in detail below, according to the present techniques the sharing of wireless-spectrum among the multiple service-provider-networks hosted in the WNC-architecture is achieved through a module referred to herein as a "resource-broker," which interfaces with the individual "resource-management" modules within the compute-pools of the various service providers. Each resource management module will provide as input to the resource-broker the set of wireless resources that it needs (or has currently available) for a specified time duration. The resource-broker will then pair available resources (e.g., spectrum, time-slots in a time-slot based cellular network (e.g., LTE), etc.) with the requests, which can be achieved in various ways including a market mechanism of price bidding.

Some notable advantages of the present techniques include, but are not limited to: (1) they provide additional revenue for under-utilized spectrum of a service provider, (2) alleviation of capacity issues due to time-varying demand fluctuations, and (3) efficient utilization of scarce spectrum. Thus, the present techniques will make the wireless spectrum a less rigid commodity and enable its efficient utilization in WNC-based cellular networks.

FIG. 1 is a diagram illustrating a wireless network cloud architecture 100 in which the present resource sharing system is implemented. As shown in FIG. 1, the network consists of remote radio heads (or wireless antennae) that connect to a network cloud/data-center where wireless signals are processed and data-bits extracted by a pool of virtual base-stations. The base-stations connect to the Internet/PSTN network. The base-stations are remote radio heads without baseband signal processing capabilities. WNC architecture 100 exploits the advantages of data-center computing, namely dynamic resource provisioning of compute resources in a data-center, statistical multiplexing, easy capacity scaling, virtualization, etc.

Figure 2:
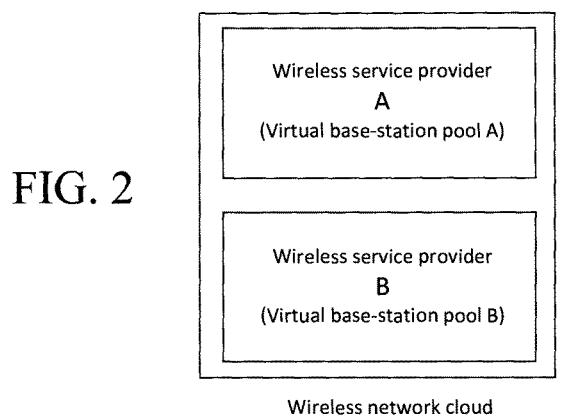
FIG. 2 is a diagram illustrating an exemplary wireless network cloud in a multi-tenancy WNC according to an embodiment of the present invention.

In WNC-based multi-service-provider cellular networks (also referred to herein as a "multi-tenancy" WNC), each service-provider (of multiple service-providers) has an associated base-station pool for signal processing. This base-station pool could be either a physical set of servers or a set of virtual machines hosted in each service-provider's data-center or in a common cloud of compute resources. For example, as shown in FIG. 2, there are two base-station pools, virtual base-station pool A and virtual base-station pool B corresponding to wireless service-provider-A and wireless service-provider-B, respectively.

Figure 3:
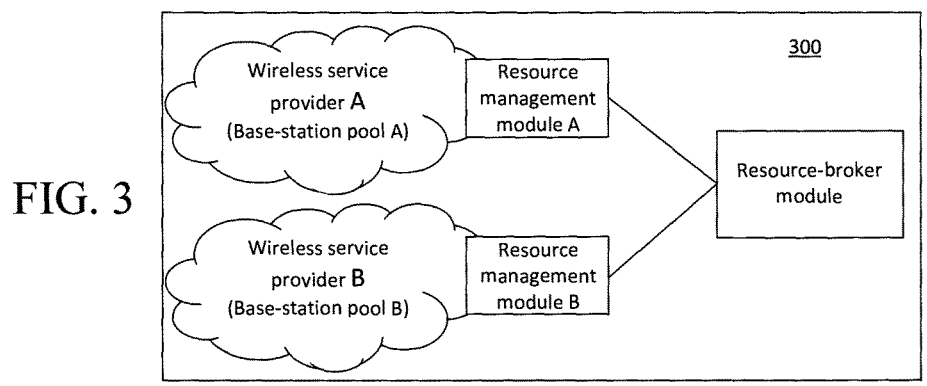
FIG. 3 is a diagram illustrating an exemplary system for dynamic sharing of network resources (e.g., spectrum) at fast time-scales in a WNC according to an embodiment of the present invention.

Provided herein is a system 300 for dynamic sharing of network resources such as spectrum at fast time-scales in a WNC. See FIG. 3. As shown in FIG. 3, the system 300 includes "resource management" (software) modules at each service provider base-station pool and a "resource broker" module that interfaces with the individual resource management modules (which could spread across different data-centers). System 300 may be embodied in an apparatus, such as apparatus 500 shown in FIG. 5, described below, and may be configured to perform exemplary methodology 400 for spectrum sharing in a wireless network cloud that hosts multiple wireless service providers, described in conjunction with the description of FIG. 4, below.

The present techniques will now be described in the context of sharing wireless network spectrum. However, it is to be understood that the present techniques may be implemented to dynamically share, at fast-time scales, network resources other than wireless spectrum, such as, time-slots in a time-slot based cellular network (e.g., LTE).

In the exemplary embodiment shown in FIG. 3, each resource management module maintains the current state of the wireless spectrum that is being used in the respective service-provider network. The term "state" as used herein refers to the current utilization (e.g., 50%) of a spectrum unit (e.g., a spectrum band with a specified frequency range). Each resource management module also maintains a history of spectrum utilization (for the respective service-provider network) and predicts (based on user demands) the capacity/spectrum requirement in a specified future time-window. The capacity does not change over time, but how much of the capacity gets utilized does change over time. Therefore, the unused capacity changes over time. The term "capacity" as used herein refers to the maximum number of users that can be supported in a given frequency spectrum if the spectrum is utilized at full 100% utilization.

As will be described in detail below, based on the above-described capabilities of the resource management modules to ascertain spectrum utilization and to predict spectrum utilization over a given time-window, the present techniques will then be implemented to determine an excess spectrum capacity, if any, for each wireless service provider over the given time-window (i.e., the amount by which the spectrum capacity exceeds the predicted demand over the time-window). The excess capacity, where available, can then be reallocated (by the resource-broker module, see below) to those service-providers who have a demand.

Specifically, the resource-broker module provides a mechanism for pairing unused spectrum with spectrum demands across the multiple service-providers in a WNC based cellular network. The resource-broker module receives as input the amount of spectrum that each service-provider needs for a given time-window. The resource-broker module can also receive other inputs such as the preferred frequency band, preferred service-providers to lease the spectrum from, etc. Similarly, service-providers with under-utilized/available spectrum provide as input the amount of spectrum and the time duration of availability. The above-described time-window is the granularity at which the resource-broker module performs spectrum allocation—for example, at 1 minute intervals. The time duration of availability is the time(s) within the above time-window when a particular portion of the spectrum will be available (i.e., unused by the users of a particular service provider in a particular geographical region).

The service-providers can also provide other inputs such as preferred service-providers to lease to, the price at which the spectrum will be leased, etc. The resource broker module uses these inputs to make spectrum allocation/leasing decisions, which can be done through a pre-specified policy (such as a fixed price) or through a market mechanism of price bids. Spectrum leasing is described for example in O. Simeone et al., "Spectrum Leasing to Cooperating Secondary Ad Hoc Networks," IEEE Journal on Selected Areas in Communications, vol. 26, No. 1, January 2008, the contents of which are incorporated by reference herein. See also, J. M. Peha, "Approaches to Spectrum Sharing," IEEE Communications Magazine, February 2005, the contents of which are incorporated by reference herein, which describes a pricing model for spectral leasing. A market auctioning system for spectrum leasing is described for example in S. K. Jayaweera et al., "Learning to Thrive in a Leasing Market: An Auctioning Framework for Distributed Dynamic Spectrum Leasing (D-DSL)," IEEE Wireless Communications & Networking Conference (WCNC 2011), Cancun, Mexico, March 2011, the contents of which are incorporated by reference herein.

According to the present techniques, in a market auction mechanism, the resource management modules will interact with the resource-broker module to submit price bids to obtain available spectrums. By way of example only, the resource management modules can interact with the resource-broker module through software agents running within the resource management modules and the resource-broker module, that exchange information with each other. The spectrum sharing decision from the resource-broker module is then implemented across the service provider networks. For example, if additional spectrum is acquired by service-provider A, the wireless devices in this service provider's network utilize this additional spectrum over the specified availability time-window through the techniques of carrier aggregation. Similarly, devices in another service provider network stop communication on the leased-out spectrum—for example, certain time-slots on the specified spectrum bands are not utilized. Carrier aggregation is described, for example, in Yonis et al., "Effective Carrier Aggregation on the LTE-Advanced Systems," International Journal of Advanced Science and Technology, vol. 41, April, 2012, the contents of which are incorporated by reference herein.

Figure 4:
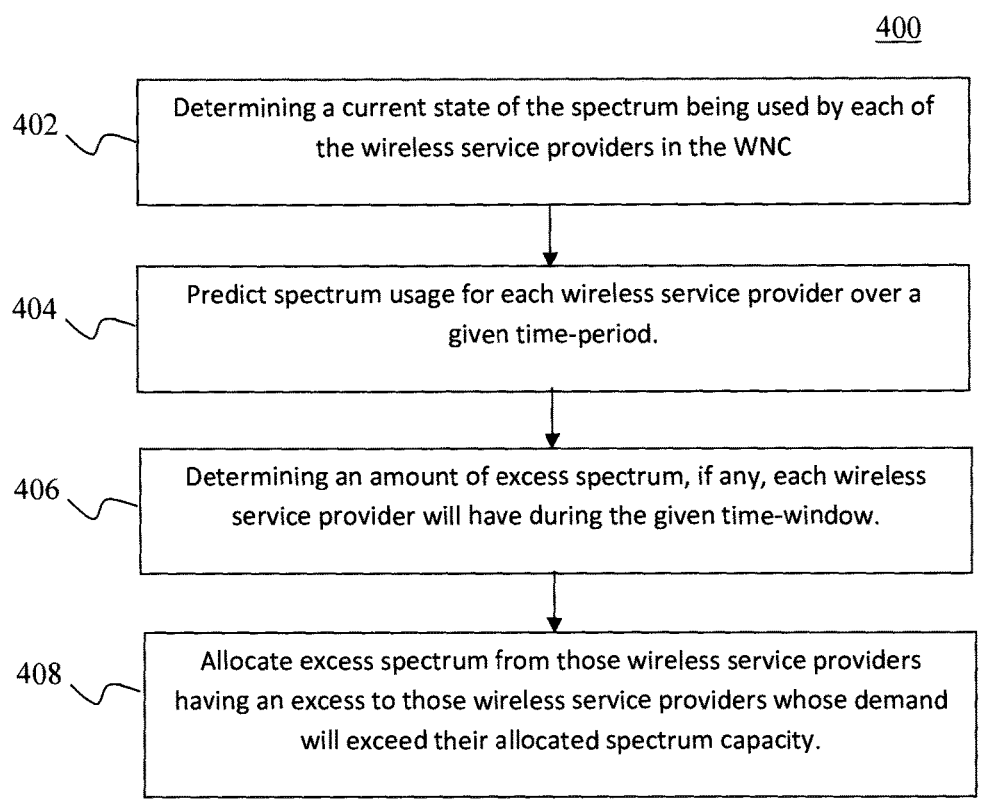
FIG. 4 is a diagram illustrating an exemplary methodology for spectrum sharing in a wireless network cloud that hosts multiple wireless service providers according to an embodiment of the present invention.

The steps of the wireless network resource allocation/sharing methodology, performed, e.g., by system 300 (of FIG. 3), are now described in detail by way of reference to FIG. 4. Specifically, FIG. 4 is a diagram illustrating exemplary methodology 400 for spectrum sharing in a wireless network cloud that hosts multiple wireless service providers.

The first task in methodology 400 is to determine or to predict, for a given time-window in the future, how much spectrum each of the wireless service providers in the WNC will need (i.e., spectrum demand) and how much spectrum will be available for leasing/allocating during that time-window. The spectrum here refers to the combination of radio frequency bands and communication time-slots (see above). As will be described in detail below, the amount of spectrum available for leasing will be quantified based on the amount of spectrum capacity less the demand by each of the providers. Namely, if a provider's demand over the given time-window is going to be less than that provider's allocated spectrum, then that provider can then lease the excess spectrum they have to another provider(s) who might have a demand (again over the given time-window) that exceeds their allocated amount.

According to an exemplary embodiment, this prediction of spectrum demand and availability is determined, in step 402, by first determining a current state of the spectrum being used by each of the wireless service providers. Basically, in step 402 it is determined how much spectrum each of the wireless service providers are currently using. This data can be maintained so that a history of usage for each provider can be ascertained to better produce an accurate prediction of future usage. As provided above, the current spectrum demand for each wireless service provider is determined based on user demand. For example, the current spectrum demand for wireless service provider A will simply be an aggregate of the current spectrum demand by wireless service provider A's users.

As provided above, in system 300 (of FIG. 3) this step 402 may be performed by each of the resource management modules for their respective wireless service provider. For instance, resource management module A determines the current spectrum usage of wireless service provider A, resource management module B determines the current spectrum usage of wireless service provider B, and so on. As provided above, this data can be maintained, e.g., by the respective resource management modules, to compile a history of each of the wireless service providers' usage demands.

Next, in step 404, based on the usage data collected in step 402 (as well as the usage history, if available) predictions are made as to what the usage will be for each of the wireless service providers during the future time-window. By way of example only, a time-window could be 1 minute and the usage prediction is made for the next time-window. The prediction can be done using forecasting techniques such as Auto-Regressive Integrated Moving Average (ARIMA) model based forecasting. See, for example, P. Brockwell, R. Davis, "Introduction to time series and forecasting," Springer, 2nd edition, 2002, the contents of which are incorporated by reference herein. As provided above, in system 300 (of FIG. 3) this step 404 may be performed by each of the resource management modules for their respective wireless service provider. For instance, resource management module A predicts what the spectrum usage of wireless service provider A will be during the given time-window, resource management module B predicts what the spectrum usage of wireless service provider B will be during the given time-window, and so on.

Based on the predictions made in step 404, a determination is then made in step 406 as to an amount of excess spectrum, if any, each wireless service provider will have during the given time-window. As highlighted above, this is simply (for the given time-window) the amount of spectrum capacity allocated (for example, the spectrum allocated by the FCC to a service provider as a long-term contract) to a given wireless service provider less the predicted demand (from step 404). Thus, the spectrum capacity allocated to a wireless service provider is a given, known quantity. As will be described in detail below, the excess spectrum is what will be leased from providers who have an excess to those whose demand exceeds their allocated capacity. Again referring to system 300 (of FIG. 3) this step 406 may be performed by each of the resource management modules for their respective wireless service provider. For instance, resource management module A determines the amount of excess spectrum, if any, wireless service provider A will have during the given time-window, resource management module B determines the amount of excess spectrum, if any, wireless service provider B will have during the given time-window, and so on.

Now that the spectrum demands (during the given time-window) for each of the wireless service providers has been predicted and the amounts of excess spectrum that will be available has been determined, in step 408, the excess spectrum can be allocated from those providers having an excess to those providers whose demands will exceed their allocated capacity. In general, the allocation can be made for any future time-window if accurate prediction is available, but in a practical system, this decision would likely be made for the next time window. And this will be done recursively in time. For example, at current time, the above allocation decision is made for the next time-window. For example, if the time-window granularity is 1 minute, the allocation decision is made for the next 1 minute window. In general, this allocation is performed based on i) the predicted spectrum demands and ii) the amount of excess spectrum that will be available.

As provided above, in system 300 (of FIG. 3) this step 408 may be performed by the resource-broker module which interfaces (and receives input from) the various resource management modules. As indicated above, in general the allocation performed in step 408 is based on the predicted spectrum demands and the amount of excess spectrum that will be available. In this case, the resource-broker module takes as input (from the individual resource management modules) the demand and excess spectrum data for each wireless service provider—determined according to steps 402-406, described above. The resource-broker module will then allocate the excess spectrum to accommodate any of the above-described deficits. As an example, suppose that service provider A has 1 unit of spectrum which is predicted to be unused in the next time-window (where the spectrum unit is measured in terms of the frequency band and the time duration it is available) and service provider B has 1 unit of spectrum demand above its long-term allocated capacity, then the spectrum unit from A can be leased to B over that time-window.

However, as provided above, this allocation can be also be based on a number of additional factors. The resource-broker module can also receive other inputs such as the preferred frequency band (for example, spectrum available in specific frequency bands is given priority over other bands when allocation decision is made), preferred service-providers to lease the spectrum from (for example, certain service providers might prefer to lease spectrum from other specific service providers due to preferential business relationships), etc. Similarly, service-providers with under-utilized/available spectrum provide as input the amount of spectrum and the time duration of availability (for example, spectrum is available over a certain subset of the time-window). In one example, the spectrum assignment decision with all the above inputs can be solved as a constrained optimization problem. See for example, D. Bertsimas and J. Tistsiklis, "Introduction to linear optimization," Athena Scientific Publishers, 1997, the contents of which are incorporated by reference herein.

As described above, based on the allocation made in step 408 across the service provider networks, each provider can configure their users accordingly, i.e., based on the allocation. For example, each provider can adjust the signal processing parameters of the mobile devices and the virtual base-station pools in accordance with the spectrum allocation decision over the given time-window. For example, users of the service provider network that received additional spectrum communicate over available time-slots in the specified frequency band, and users in the service provider network that leased the spectrum are restricted from using those time-slots in those frequency bands. Since the allocation was based on user demands, both service providers will have sufficient capacity to fulfill the demands of their users (i.e., the latter service provider has less demand and can satisfy its users with less spectrum).

Figure 5:
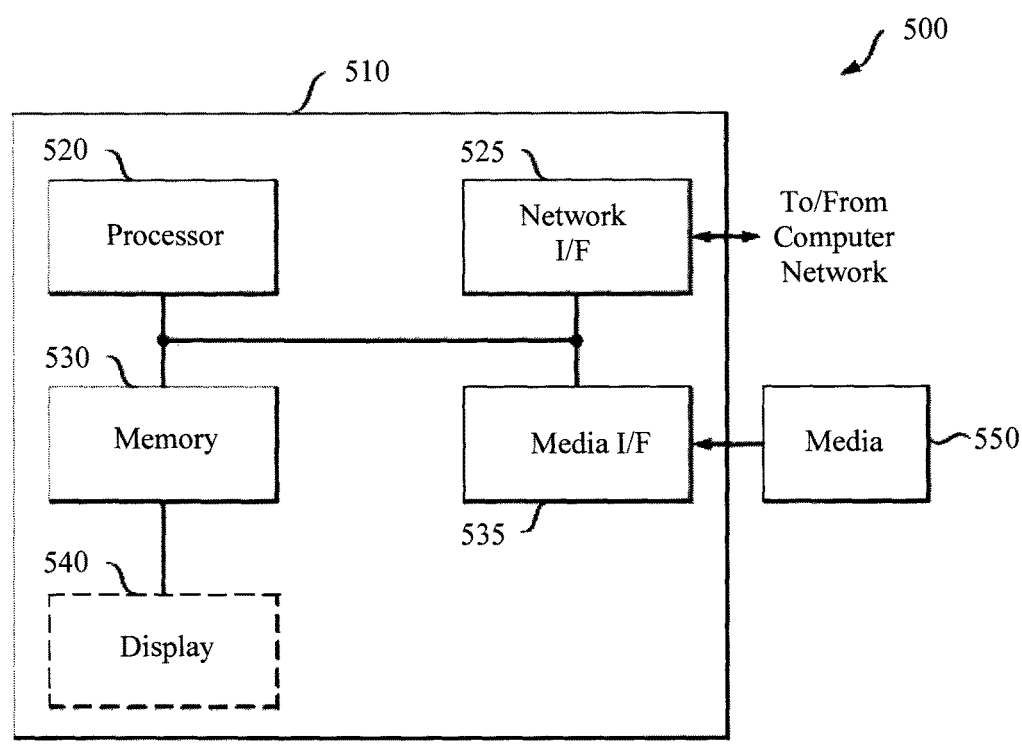
FIG. 5 is a diagram illustrating an exemplary apparatus for performing one or more of the methodologies presented herein according to an embodiment of the present invention.

Turning now to FIG. 5, a block diagram is shown of an apparatus 500 for implementing one or more of the methodologies presented herein. By way of example only, apparatus 500 can be configured to implement one or more of the steps of methodology 400 of FIG. 4 for spectrum sharing in a wireless network cloud (WNC) that hosts multiple wireless service providers.

Apparatus 500 includes a computer system 510 and removable media 550. Computer system 510 includes a processor device 520, a network interface 525, a memory 530, a media interface 535 and an optional display 540. Network interface 525 allows computer system 510 to connect to a network, while media interface 535 allows computer system 510 to interact with media, such as a hard drive or removable media 550.

As is known in the art, the methods and apparatus discussed herein may be distributed as an article of manufacture that itself includes a machine-readable medium containing one or more programs which when executed implement embodiments of the present invention. For instance, when apparatus 500 is configured to implement one or more of the steps of methodology 400 the machine-readable medium may contain a program configured to predict a spectrum usage for each of the wireless service providers during a given future time-window; determine an excess amount of spectrum, if any, each of the wireless service providers will have during the given time-window; and allocate the excess amount of spectrum from the wireless service providers having the excess amount of spectrum to those of the wireless service providers having a spectrum usage that will exceed an allocated spectrum capacity during the given time-window.

The machine-readable medium may be a recordable medium (e.g., floppy disks, hard drive, optical disks such as removable media 550, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used.

Processor device 520 can be configured to implement the methods, steps, and functions disclosed herein. The memory 530 could be distributed or local and the processor device 520 could be distributed or singular. The memory 530 could be implemented as an electrical, magnetic or optical memory, or any combination of these or other types of storage devices. Moreover, the term "memory" should be construed broadly enough to encompass any information able to be read from, or written to, an address in the addressable space accessed by processor device 520. With this definition, information on a network, accessible through network interface 525, is still within memory 530 because the processor device 520 can retrieve the information from the network. It should be noted that each distributed processor that makes up processor device 520 generally contains its own addressable memory space. It should also be noted that some or all of computer system 510 can be incorporated into an application-specific or general-use integrated circuit.

Optional display 540 is any type of display suitable for interacting with a human user of apparatus 500. Generally, display 540 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A system for spectrum sharing in a wireless network cloud that hosts multiple wireless service providers, the system comprising:
   resource management circuits associated with each of the wireless service providers configured to (a) predict a spectrum usage for each of the wireless service providers during a given future time-window, and (b) determine an excess amount of spectrum, if any, each of the wireless service providers will have during the given time-window, wherein each of the wireless service providers has an associated base-station pool for signal processing, and wherein the resource management circuits are present at the base-station pool for each of the wireless service providers, wherein the wireless service providers comprise two groups of wireless service providers; and
   a resource-broker circuit that interfaces with the resource management circuits configured to allocate the excess amount of spectrum from a first group of wireless service providers having the excess amount of spectrum to a second group of wireless service providers having a spectrum usage that will exceed an allocated spectrum capacity during the given time-window, wherein i) the spectrum usage predicted for each of the wireless service providers during the given time-window, ii) the excess amount of spectrum each of the wireless service providers is determined to have during the given time-window, and iii) which one of the first group of wireless service providers having the excess amount of spectrum a given one of the second group of wireless service providers prefers receiving allocations from are used by the resource-broker circuit to automatically make spectrum allocation decisions which are implemented by the resource-broker circuit across the wireless service providers via spectrum allocations to the second group of wireless service providers for the given future time-window, wherein the resource-broker circuit is further configured to receive a preference for spectrum in specific frequency bands from the wireless service providers, and give priority to the excess amount of spectrum in the specific frequency bands over the excess amount of spectrum in other frequency bands when making the spectrum allocation decisions, wherein the spectrum allocations are made at regular time intervals of a certain predetermined duration, and wherein the given future time-window is one of the regular time intervals.

2. The system of claim 1, wherein the resource management circuits are further configured to (c) determine a current spectrum usage for each of the wireless service providers.

3. The system of claim 2, wherein the current spectrum usage for a given one the wireless service providers is an aggregate of current spectrum usage by users of the given wireless service provider.

4. The system of claim 1, wherein the resource management circuits are further configured to (d) maintain a spectrum usage history for each of the wireless service providers.

5. The system of claim 1, wherein the resource management circuits are configured to predict the spectrum usage for each of the wireless service providers during the given future time-window based on a spectrum usage history for each of the wireless service providers.

6. The system of claim 1, wherein allocation of the excess amount of spectrum is further based on which of the wireless service providers having the spectrum usage that will exceed the allocated spectrum capacity a given one of the wireless service providers prefers making allocations to.

7. The system of claim 1, wherein the spectrum allocation decisions are made recursively in time whereby, at a current time, a spectrum allocation decision is made for a next upcoming one of the regular time intervals.

8. The system of claim 1, wherein the certain predetermined duration comprises one minute such that the spectrum allocations are made at regular one minute time intervals.

9. The system of claim 1, wherein the resource-broker circuit imposes a fixed price on the excess amount of spectrum allocated to the second group of wireless service providers for the given future time-window.

10. An apparatus for spectrum sharing in a wireless network cloud that hosts multiple wireless service providers, the apparatus comprising:
    a memory; and
    at least one processor device, coupled to the memory, operative to:
       predict a spectrum usage for each of the wireless service providers during a given future time-window;
       determine an excess amount of spectrum, if any, each of the wireless service providers will have during the given time-window, wherein each of the wireless service providers has an associated base-station pool for signal processing, and wherein resource management circuits are present at the base-station pool for each of the wireless service providers, the resource management circuits being configured to predict the spectrum usage and determine the excess amount of spectrum, wherein the wireless service providers comprise two groups of wireless service providers; and
       allocate the excess amount of spectrum from a first group of wireless service providers having the excess amount of spectrum to a second group of wireless service providers having a spectrum usage that will exceed an allocated spectrum capacity during the given time-window, wherein i) the spectrum usage predicted for each of the wireless service providers during the given time-window, ii) the excess amount of spectrum each of the wireless service providers is determined to have during the given time-window, and iii) which one of the first group of wireless service providers having the excess amount of spectrum a given one of the second group of wireless service providers prefers receiving allocations from are used by a resource-broker circuit that interfaces with the resource management circuits to automatically make spectrum allocation decisions which are implemented by the resource-broker circuit across the wireless service providers via spectrum allocations to the second group of wireless service providers for the given future time-window, wherein the resource-broker circuit is configured to receive a preference for spectrum in specific frequency bands from the wireless service providers, and give priority to the excess amount of spectrum in the specific frequency bands over the excess amount of spectrum in other frequency bands when making the spectrum allocation decisions, wherein the spectrum allocations are made at regular time intervals of a certain predetermined duration, and wherein the given future time-window is one of the regular time intervals.

11. The apparatus of claim 10, wherein the at least one processor device is further operative to:
   determine a current spectrum usage for each of the wireless service providers.

12. The apparatus of claim 11, wherein the current spectrum usage for a given one the wireless service providers is an aggregate of current spectrum usage by users of the given wireless service provider.

13. The apparatus of claim 10, wherein the at least one processor device is further operative to:
   maintain a spectrum usage history for each of the wireless service providers.

14. The apparatus of claim 10, wherein the excess amount of spectrum, if any, each of the wireless service providers will have during the given time-window is an allocated spectrum capacity for each of the wireless service providers less the spectrum usage predicted for each of the wireless service providers during the given time-window.

15. An article of manufacture for spectrum sharing in a wireless network cloud that hosts multiple wireless service providers, comprising a non-transitory machine-readable recordable medium containing one or more programs which are executed by a processor to:
   predict a spectrum usage for each of the wireless service providers during a given future time-window;
   determine an excess amount of spectrum, if any, each of the wireless service providers will have during the given time-window, wherein each of the wireless service providers has an associated base-station pool for signal processing, and wherein resource management circuits are present at the base-station pool for each of the wireless service providers, the resource management circuits being configured to predict the spectrum usage and determine the excess amount of spectrum, wherein the wireless service providers comprise two groups of wireless service providers; and
   allocate the excess amount of spectrum from a first group of wireless service providers having the excess amount of spectrum to a second group of wireless service providers having a spectrum usage that will exceed an allocated spectrum capacity during the given time-window, wherein i) the spectrum usage predicted for each of the wireless service providers during the given time-window, ii) the excess amount of spectrum each of the wireless service providers is determined to have during the given time-window, and iii) which one of the first group of wireless service providers having the excess amount of spectrum a given one of the second group of wireless service providers prefers receiving allocations from are used by a resource-broker circuit that interfaces with the resource management circuits to automatically make spectrum allocation decisions which are implemented by the resource-broker circuit across the wireless service providers via spectrum allocations to the second group of wireless service providers for the given future time-window, wherein the resource-broker circuit is configured to receive a preference for spectrum in specific frequency bands from the wireless service providers, and give priority to the excess amount of spectrum in the specific frequency bands over the excess amount of spectrum in other frequency bands when making the spectrum allocation decisions, wherein the spectrum allocations are made at regular time intervals of a certain predetermined duration, and wherein the given future time-window is one of the regular time intervals.

\* \* \* \* \*